United States Patent
Kiyokawa

(10) Patent No.: US 12,552,415 B2
(45) Date of Patent: Feb. 17, 2026

(54) PARKING EXIT ASSISTANCE APPARATUS

(71) Applicant: AISIN CORPORATION, Aichi (JP)

(72) Inventor: Yusuke Kiyokawa, Tokyo (JP)

(73) Assignee: AISIN CORPORATION, Aichi (JP)

( * ) Notice: Subject to any disclaimer, the term of this patent is extended or adjusted under 35 U.S.C. 154(b) by 64 days.

(21) Appl. No.: 18/691,237

(22) PCT Filed: Jul. 22, 2022

(86) PCT No.: PCT/JP2022/028518
§ 371 (c)(1),
(2) Date: Mar. 12, 2024

(87) PCT Pub. No.: WO2023/053694
PCT Pub. Date: Apr. 6, 2023

(65) Prior Publication Data
US 2024/0375685 A1 Nov. 14, 2024

(30) Foreign Application Priority Data

Sep. 30, 2021 (JP) .................................. 2021-161587

(51) Int. Cl.
*B60W 60/00* (2020.01)
*G06V 20/58* (2022.01)

(52) U.S. Cl.
CPC ......... *B60W 60/0025* (2020.02); *G06V 20/58* (2022.01); *B60W 2510/20* (2013.01)

(58) Field of Classification Search
CPC ............. B60W 60/0025; B60W 30/06; B60W 2510/20; G06V 20/58; G08G 1/168; B62D 15/027; B62D 15/0285
See application file for complete search history.

(56) References Cited

U.S. PATENT DOCUMENTS

| | | |
|---|---|---|
| 2012/0191284 A1 | 7/2012 | Fehse et al. |
| 2018/0061241 A1 | 3/2018 | Iwami et al. |

(Continued)

FOREIGN PATENT DOCUMENTS

| | | |
|---|---|---|
| EP | 2 230 155 A1 | 9/2010 |
| JP | 2020-111248 A | 7/2020 |

(Continued)

OTHER PUBLICATIONS

International Search Report issued Oct. 11, 2022 in International Application No. PCT/JP2022/028518.

(Continued)

*Primary Examiner* — Huan Le
(74) *Attorney, Agent, or Firm* — Sughrue Mion, PLLC

(57) ABSTRACT

A parking exit assistance apparatus according to an embodiment includes an obstacle detection unit that detects an obstacle around a host vehicle, a path calculation unit that calculates, on the basis of a result of detecting the obstacle, a parking exit path along which the host vehicle travels when exiting from a parking area, an operation detection unit that detects a predetermined operation performed by a driver, and a control unit that executes at least steering control on the basis of the parking exit path to perform parking exit assistance control for assisting the host vehicle to exit from the parking area, and, in a case where a positional relation between the host vehicle and the obstacle that the host vehicle approaches by completion of the exit satisfies a predetermined condition, ends the parking exit assistance control if the predetermined operation is detected by the operation detection unit.

8 Claims, 8 Drawing Sheets

(56) References Cited

U.S. PATENT DOCUMENTS

2020/0223448 A1\* 7/2020 Sakurai ............ B60W 60/0053
2020/0282975 A1  9/2020 Minase et al.

FOREIGN PATENT DOCUMENTS

| JP | 2020-142752 A | 9/2020 |
| JP | 2023-46472 A | 4/2023 |

OTHER PUBLICATIONS

European Office Action dated Nov. 6, 2024 in Application No. 22875571.6.

\* cited by examiner

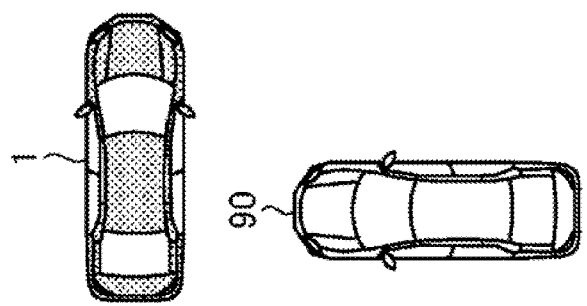
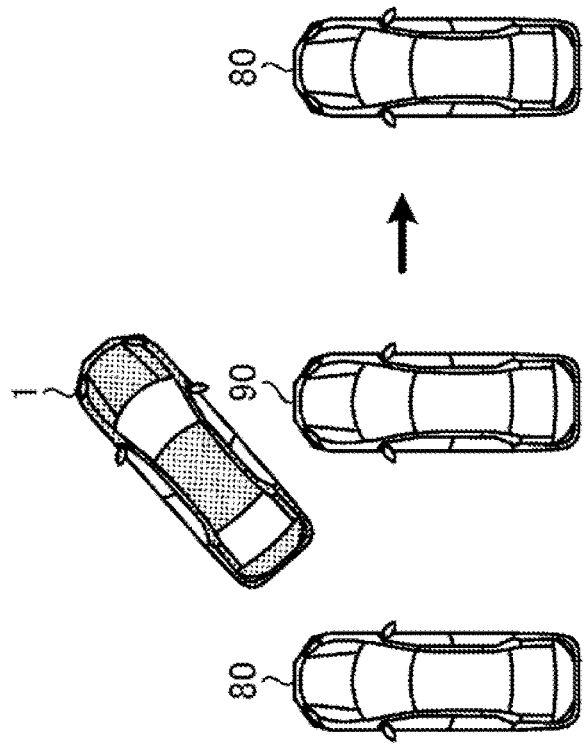
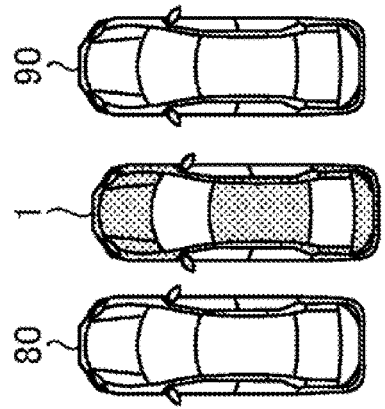

PARKING EXIT ASSISTANCE APPARATUS

CROSS REFERENCE TO RELATED APPLICATIONS

This is a National Stage of International Application No. PCT/JP2022/028518 filed Jul. 22, 2022, claiming priority based on Japanese Patent Application No. 2021-161587 filed Sep. 30, 2021, the entire contents of which are incorporated in their entirety.

TECHNICAL FIELD

An embodiment of the present disclosure relates to a parking exit assistance apparatus.

BACKGROUND ART

Conventionally, there is a technique for assisting a vehicle parked in a parking area to exit. In this parking exit assistance technique, for example, a path is generated so as not to come into contact with surrounding obstacles, and the vehicle is guided along the path. Furthermore, control is transferred from a system to a driver after the parking exit assistance is completed, under a condition that the vehicle is at a stop, in consideration of safety.

CITATIONS LIST

Patent Literature

Patent Literature 1: JP 2020-142752 A

SUMMARY OF THE DISCLOSURE

Technical Problems

However, if the stop is a condition for transfer of control, there is such a problem that it takes time, which is less convenient.

Therefore, the present disclosure has been made in view of the circumstances described above, and aims to provide a parking exit assistance apparatus that is able to ensure safety even if control is transferred from a system to a driver without a vehicle stopping.

Solutions to Problems

In order to solve the problem described above, a parking exit assistance apparatus according to an embodiment includes an obstacle detection unit that detects an obstacle around a host vehicle, a path calculation unit that calculates, on the basis of a result of detecting the obstacle by the obstacle detection unit, a parking exit path that is a path along which the host vehicle travels when exiting from a parking area, an operation detection unit that detects a predetermined operation performed by a driver, and a control unit that executes at least steering control on the basis of the parking exit path to perform parking exit assistance control for assisting the host vehicle to exit from the parking area, and, in a case where a positional relation between the host vehicle and the obstacle that the host vehicle approaches by completion of the exit satisfies a predetermined condition, ends the parking exit assistance control if the predetermined operation is detected by the operation detection unit.

According to the configuration described above, in a case where the positional relation between the host vehicle and the obstacle satisfies the predetermined condition, the predetermined operation by the driver ends the parking exit assistance control, by which safety can be ensured even if control is transferred from the system to the driver without the host vehicle stopping.

Furthermore, in the parking exit assistance apparatus according to the embodiment, the predetermined condition is a state where the host vehicle has passed a position where the host vehicle comes closest to the obstacle.

According to the configuration described above, the state specifically described above can be adopted as a predetermined condition.

Furthermore, in the parking exit assistance apparatus according to the embodiment, the predetermined condition is a state where it is determined that the host vehicle is planned to pass on the basis of the parking exit path, with a clearance of a predetermined distance or longer from the obstacle ensured.

According to the configuration described above, the state specifically described above can be adopted as a predetermined condition.

Furthermore, in the parking exit assistance apparatus according to the embodiment, the operation detection unit detects, as the predetermined operation, at least any of an operation of a steering wheel, operation of a brake, or operation of an accelerator when a gear shift lever is in a drive mode.

According to the configuration described above, by these operations being detected, the parking exit assistance apparatus can reliably recognize that the driver wishes transfer of the control.

Furthermore, in the parking exit assistance apparatus according to the embodiment, the predetermined operation is an operation in a direction in which the clearance from the obstacle is not reduced.

According to the configuration described above, safety can be further ensured on condition that the clearance from the obstacle is not reduced.

Furthermore, in the parking exit assistance apparatus according to the embodiment, in a case of a perpendicular-parking forward exit, the control unit ends the parking exit assistance control if the predetermined operation is detected by the operation detection unit in a case where a side surface of an inner-side of a turning rear wheel shaft of the host vehicle has passed a position where the host vehicle comes closest to another vehicle as the obstacle, the another vehicle being parked next to an exit direction side of the host vehicle in the parking area, or in a case where it is determined that the host vehicle is planned to pass on the basis of the parking exit path, with a clearance of the predetermined distance or longer from the another vehicle ensured.

According to the configuration described above, in a case of a perpendicular-parking forward exit, it is possible to end the parking exit assistance control and transfer control to the driver while reliably avoiding a situation where the host vehicle hits the another vehicle parked next to the exit direction side of the host vehicle.

Furthermore, in the parking exit assistance apparatus according to the embodiment, in a case of a perpendicular-parking forward exit, the control unit ends the parking exit assistance control if the predetermined operation is detected by the operation detection unit in a case where a front end part of the host vehicle has passed a position where the host vehicle comes closest to the obstacle positioned across an aisle in front of the host vehicle in the parking area, or in a case where it is determined that the host vehicle is planned to pass on the basis of the parking exit path, with a clearance of the predetermined distance or longer from the obstacle ensured.

According to the configuration described above, in a case of a perpendicular-parking forward exit, it is possible to end the parking exit assistance control and transfer control to the driver while reliably avoiding a situation where the host vehicle hits the obstacle positioned across the aisle in front of the vehicle in the parking area.

Furthermore, in the parking exit assistance apparatus according to the embodiment, in a case of a perpendicular-parking reverse exit, the control unit ends the parking exit assistance control if the predetermined operation is detected by the operation detection unit in a case where a front end part of the host vehicle has passed a position where the host vehicle comes closest to another vehicle as the obstacle, the another vehicle being parked next to a travel direction side of exited the host vehicle in the parking area, or in a case where it is determined that the host vehicle is planned to pass on the basis of the parking exit path, with a clearance of the predetermined distance or longer from the another vehicle ensured.

According to the configuration described above, in a case of a perpendicular-parking reverse exit, it is possible to end the parking exit assistance control and transfer control to the driver while reliably avoiding a situation where the host vehicle hits the another vehicle parked next to the travel direction side of the exited host vehicle.

Furthermore, in the parking exit assistance apparatus according to the embodiment, the parking exit assistance apparatus further includes an acquisition unit that acquires, from a steering-angle sensor that detects a steering angle of the host vehicle, the steering angle, in which, in a case of a parallel-parking exit, the control unit ends the parking exit assistance control if the predetermined operation is detected by the operation detection unit in a case where a front end part of the host vehicle has passed a position where the host vehicle comes closest to another vehicle as the obstacle, the another vehicle being parked in front of the host vehicle in the parking area, or in a case where it is determined that the host vehicle is planned to pass on the basis of the parking exit path and the steering angle, with a clearance of the predetermined distance or longer from the another vehicle ensured.

According to the configuration described above, in a case of a parallel-parking exit, it is possible to end the parking exit assistance control and transfer control to the driver while reliably avoiding a situation where the host vehicle hits the another vehicle parked in front of the host vehicle.

BRIEF DESCRIPTION OF DRAWINGS

FIG. 1 is an exemplary perspective view showing a state where a part of an occupant compartment of a vehicle according to an embodiment is seen through.

FIGS. 6A, 6B and 6C are explanatory diagrams of an overview according to the embodiment.

DESCRIPTION OF EMBODIMENTS

Hereinafter, an exemplary embodiment of the present disclosure is described. The configurations of the embodiment described below, and functions, results, and effects brought about by the configurations are merely an example. The present disclosure is also feasible by configurations other than the configurations disclosed in the embodiment described below, and at least one of various effects based on a basic configuration and derivative effects may be obtained.

A vehicle 1 (host vehicle) according to the present embodiment may be, for example, an automobile using an internal combustion engine (not shown) as a drive source, that is, an internal combustion engine automobile, or may be an automobile using an electric motor (not shown) as a drive source, that is, an electric vehicle, a fuel cell-powered vehicle, or the like. Furthermore, the vehicle 1 may be a hybrid vehicle using both an internal combustion engine and an electric motor as drive sources, or may be a vehicle including another drive source. Furthermore, the vehicle 1 can be equipped with various transmission devices, and can be equipped with various devices necessary for driving the internal combustion engine or the electric motor, for example, systems, parts, and the like. Furthermore, a type, the number, a layout, or the like of devices related to driving of wheels 3 in the vehicle 1 can be variously set.

Figure 1:
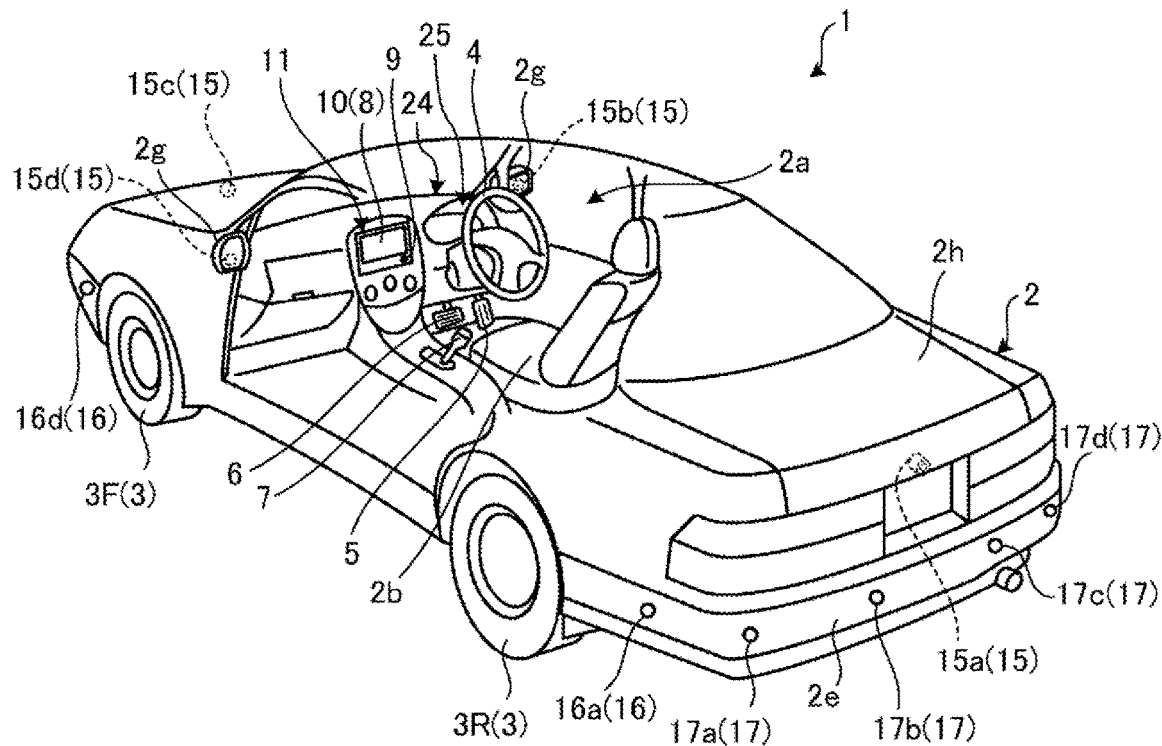
Figure 2:
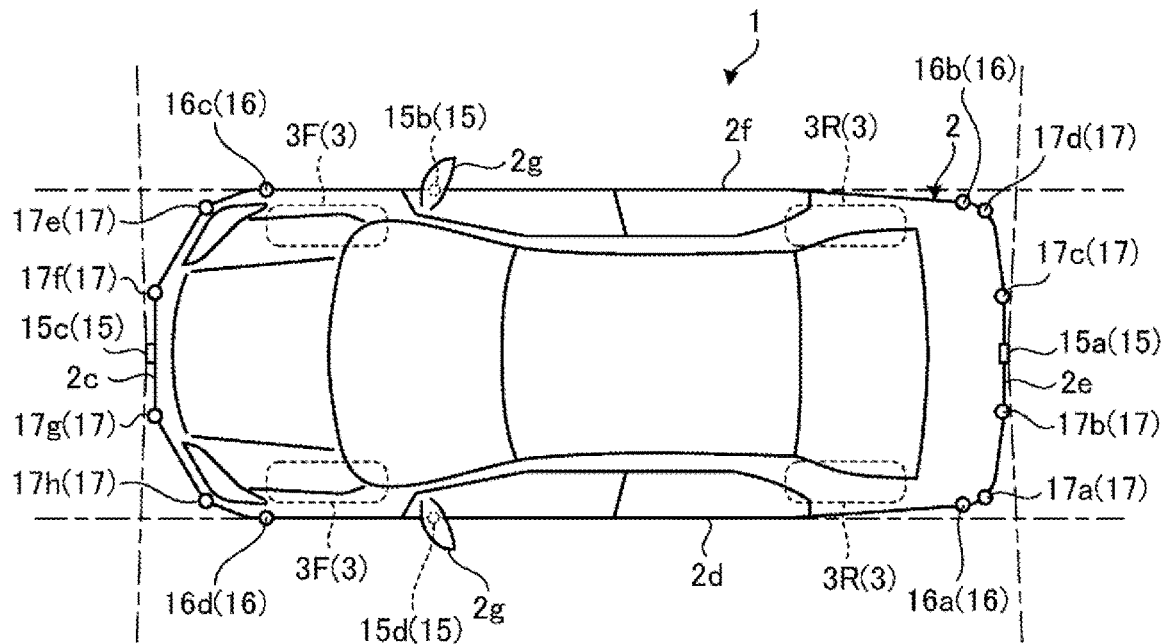
FIG. 2 is an exemplary plan view (overhead view) of the vehicle according to the embodiment.

FIG. 1 is an exemplary perspective view showing a state where a part of an occupant compartment of the vehicle 1 according to the embodiment is seen through. FIG. 2 is an exemplary plan view (overhead view) of the vehicle 1 according to the embodiment.

As exemplified in FIG. 1, a vehicle body 2 constitutes an occupant compartment 2a in which an occupant (not shown) rides. In the occupant compartment 2a, a steering unit 4, an acceleration operation unit 5, a brake operation unit 6, a transmission operation unit 7, and the like are provided in a state of facing a seat 2b for a driver as an occupant.

The steering unit 4 is, for example, a steering wheel projecting from a dashboard 24. The acceleration operation unit 5 is, for example, an accelerator pedal positioned below a foot of the driver. The brake operation unit 6 is, for example, a brake pedal positioned below a foot of the driver. The transmission operation unit 7 is, for example, a gear shift lever projecting from a center console. Note that the steering unit 4, the acceleration operation unit 5, the brake operation unit 6, and the transmission operation unit 7 are not limited thereto.

Furthermore, the occupant compartment 2a is provided therein with a display device 8 as a display output unit and an audio output device 9 as an audio output unit are provided. The display device 8 is, for example, a liquid crystal display (LCD), an organic electroluminescent display (OELD), or the like. The audio output device 9 is, for example, a speaker. Furthermore, for example, the display device 8 is covered with a transparent operation input unit 10 such as a touch panel. The occupant can visually recognize an image displayed on a display screen of the display device 8 through the operation input unit 10. Furthermore, the occupant can execute an operation input by touching, pressing, or manipulating the operation input unit 10 with a finger or the like at a position corresponding to the image displayed on the display screen of the display device 8.

The display device 8, the audio output device 9, the operation input unit 10, and the like are provided, for example, on a monitoring device 11 positioned at a central portion of the dashboard 24 in a vehicle width direction, that is, in a horizontal direction. The monitoring device 11 can include an operation input unit (not shown) such as a switch, a dial, a joystick, and a push button. Furthermore, an audio output device (not shown) can be provided at a position in the occupant compartment 2a, the position being different from the position of the monitoring device 11, and audio can be output from the audio output device 9 of the monitoring device 11 and from another audio output device. Note that the monitoring device 11 may also be used as, for example, a navigation system or an audio system.

Furthermore, in the occupant compartment 2a, a display device 12 different from the display device 8 is provided.

Figure 3:
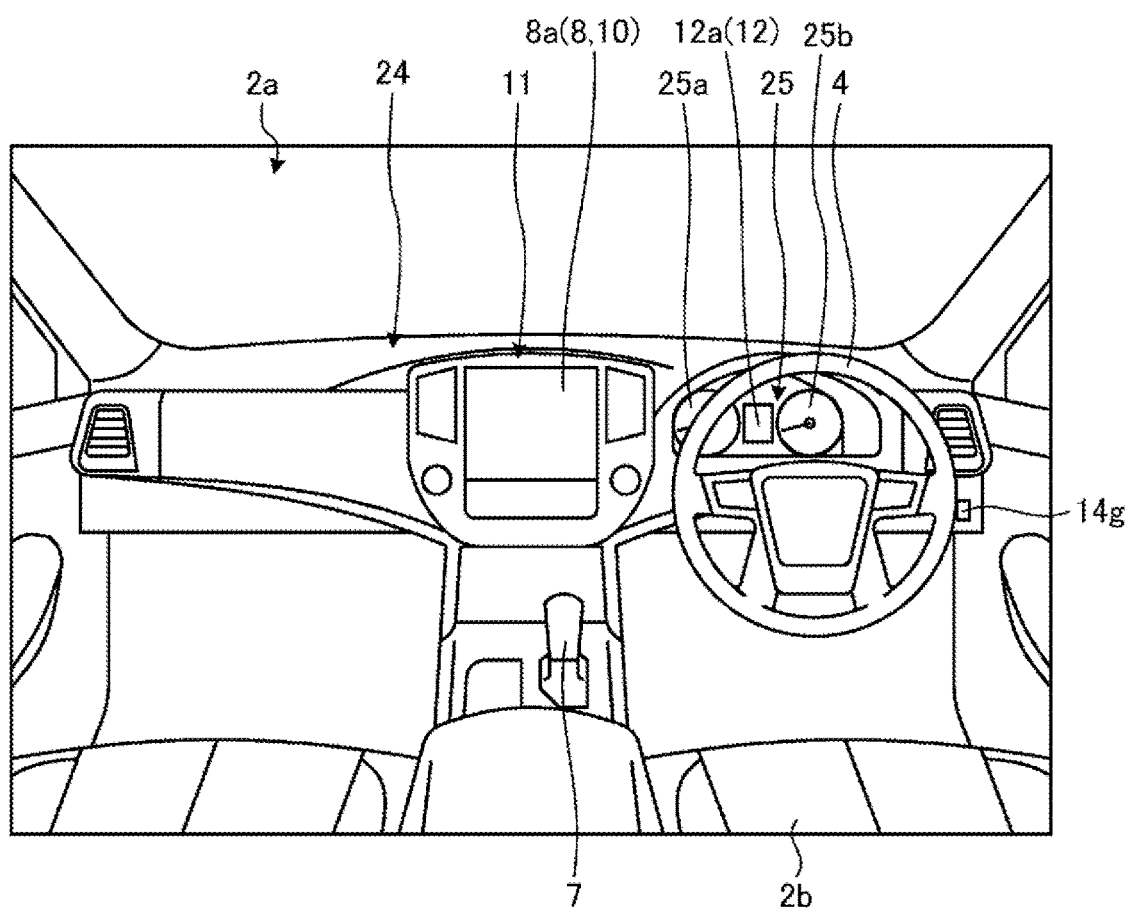
FIG. 3 is a view of an example of a dashboard of the vehicle according to the embodiment as seen from a rear of the vehicle.

FIG. 3 is a view of an example of the dashboard of the vehicle 1 according to the embodiment as seen from a rear of the vehicle.

As exemplified in FIG. 3, the display device 12 is provided, for example, on an instrument panel 25 of the dashboard 24, and is positioned substantially at a center of the instrument panel 25, between a speed display unit 25a and a revolution display unit 25b. The screen 12a of the display device 12 is smaller in size than a screen 8a of the display device 8. The display device 12 may mainly display an image showing information regarding parking exit assistance of the vehicle 1. An amount of information displayed on the display device 12 may be smaller than an amount of information displayed on the display device 8. The display device 12 is, for example, an LCD, an OELD, or the like. Note that information displayed on the display device 12 may be displayed on the display device 8.

Furthermore, as exemplified in FIGS. 1 and 2, the vehicle 1 is, for example, a four-wheeled vehicle, and includes two right and left front wheels 3F and two right and left rear wheels 3R. All of these four wheels 3 may be configured to be steerable.

Figure 4:
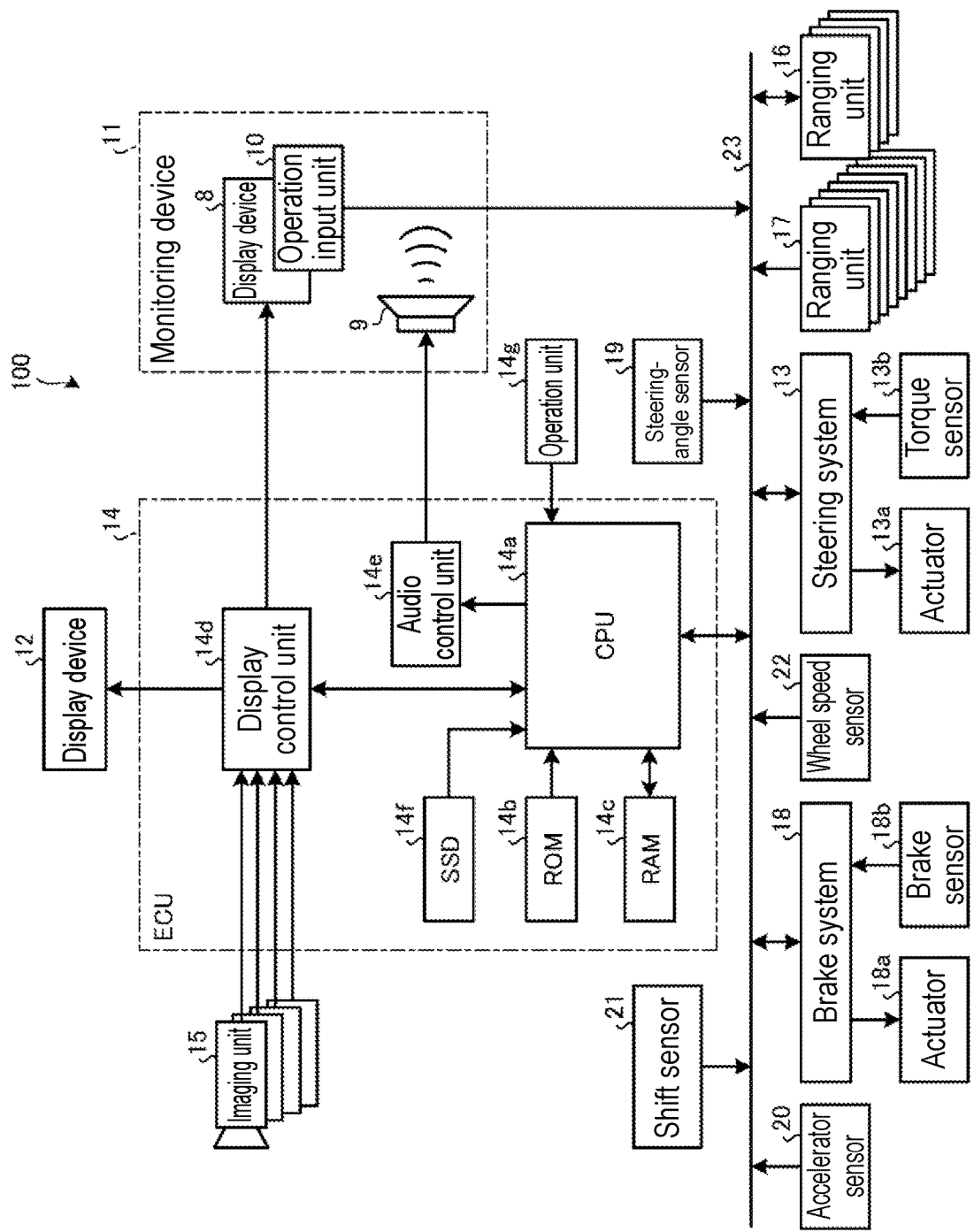
FIG. 4 is an exemplary block diagram of a configuration of a parking exit assistance system according to the embodiment.

FIG. 4 is an exemplary block diagram of a configuration of a parking exit assistance system 100 according to the embodiment.

As exemplified in FIG. 4, the vehicle 1 includes a steering system 13 that steers at least two wheels 3. The steering system 13 includes an actuator 13a and a torque sensor 13b. The steering system 13 is electrically controlled by an electronic control unit (ECU) 14 or the like to operate the actuator 13a. The steering system 13 is, for example, an electric power steering system, a steer by wire (SBW) system, or the like.

In the steering system 13, the actuator 13a applies torque, that is, assist torque to the steering unit 4 to add steering force, and the actuator 13a steers the wheels 3. In this case, the actuator 13a may steer one wheel 3 or may steer a plurality of wheels 3. Furthermore, the torque sensor 13b detects, for example, torque applied to the steering unit 4 by the driver.

Furthermore, as exemplified in FIG. 2, the vehicle body 2 is provided with, for example, four imaging units 15a to 15d as a plurality of imaging units 15. Each of the imaging units 15 is, for example, a digital camera incorporating an imaging element such as a charge coupled device (CCD) or a CMOS image sensor (CIS). The imaging units 15 can output moving image data at a predetermined frame rate. Each of the imaging units 15 includes a wide-angle lens or a fisheye lens, and can capture an image in a range from 140° to 190° in a horizontal direction, for example. Furthermore, optical axes of the imaging units 15 are set obliquely downward. Therefore, the imaging units 15 sequentially capture images of external environment around the vehicle body 2, the external environment including a road surface on which the vehicle 1 can move and an area where the vehicle 1 can be parked, and outputs the captured images as captured image data.

For example, the imaging unit 15a is positioned at an end part 2e at a rear side of the vehicle body 2, and is provided on a wall part in a lower portion of a door 2h of a rear trunk. For example, the imaging unit 15b is positioned at an end part 2f on a right side of the vehicle body 2 and is provided on a door mirror 2g on the right side. For example, the imaging unit 15c is positioned on a front side of the vehicle body 2, that is, at an end part 2c on a front side in a vehicle front-rear direction, and is provided on a front bumper or the like. For example, the imaging unit 15d is positioned on a left side of the vehicle body 2, that is, at an end part 2d on a left side in a vehicle width direction, and is provided on a door mirror 2g as a projection on the left side. The ECU 14 can execute arithmetic processing or image processing on the basis of the image data obtained by the plurality of imaging units 15 to generate an image with a wider viewing angle or generate a virtual overhead image of the vehicle 1 as viewed from above. Note that the overhead image may also be referred to as a planar image.

Furthermore, the ECU 14 identifies, on the basis of the images captured by the imaging units 15, a line marking or the like indicated on a road surface around the vehicle 1, and detects (extracts) a parking slot indicated by the line marking or the like.

Furthermore, as exemplified in FIGS. 1 and 2, the vehicle body 2 is provided with, for example, four ranging units 16a to 16d and eight ranging units 17a to 17h as a plurality of ranging units 16 and 17. The ranging units 16 and 17 are sonars that emit ultrasonic waves and capture reflected waves thereof, for example. The sonar may also be referred to as a sonar sensor or an ultrasonic detector. The ECU 14 can measure presence or absence of an object, such as an obstacle, positioned around the vehicle 1, or a distance to the object, on the basis of results of detection by the ranging units 16 and 17. That is, the ranging units 16 and 17 are an example of detection units that detect an object (obstacle). Note that the ranging units 17 may be used, for example, to detect an object at a relatively short distance, and the ranging units 16 may be used, for example, to detect an object at a relatively long distance farther than the ranging units 17. Furthermore, the ranging units 17 may be used, for example, to detect objects in front of and behind the vehicle 1, and the ranging units 16 may be used to detect objects on right and left sides of the vehicle 1.

Furthermore, as exemplified in FIG. 4, in the parking exit assistance system 100, the ECU 14, the monitoring device 11, the steering system 13, the ranging units 16 and 17, a brake system 18, a steering-angle sensor 19, an accelerator sensor 20, a shift sensor 21, a wheel speed sensor 22, and the like are electrically connected via an in-vehicle network 23 as an electric communication line.

The in-vehicle network 23 is configured as, for example, a controller area network (CAN). The ECU 14 can control the steering system 13, the brake system 18, and the like by sending a control signal via the in-vehicle network 23. Furthermore, the ECU 14 can receive, via the in-vehicle network 23, results of detection by the torque sensor 13b, a brake sensor 18b, the steering-angle sensor 19, the ranging units 16, the ranging units 17, the accelerator sensor 20, a shift sensor 21, the wheel speed sensor 22, and the like, or a signal of operation of the operation input unit 10 and the like.

The ECU 14 includes, for example, a CPU 14a (central processing unit), a ROM 14b (read only memory), a RAM 14c (random access memory), a display control unit 14d, an audio control unit 14e, an SSD 14f (solid state drive, flash memory), or the like. For example, the CPU 14a can execute various kinds of arithmetic processing and control such as image processing related to images displayed on the display devices 8 and 12, calculation of a movement target position of the vehicle 1, calculation of a movement path of the vehicle 1, judgment of whether or not there is any interference with an object (obstacle), automatic control of the vehicle 1, and cancellation of the automatic control.

The CPU 14a can read a program installed and stored in a non-volatile storage device such as the ROM 14b and execute arithmetic processing according to the program. The RAM 14c temporarily stores various data used in calculation in the CPU 14a. Furthermore, among the arithmetic processing in the ECU 14, the display control unit 14d mainly executes image processing using image data obtained by the imaging units 15, combination of image data to be displayed on the display device 8, and the like.

Furthermore, among the arithmetic processing in the ECU 14, the audio control unit 14e mainly executes processing of audio data output by the audio output device 9. Furthermore, the SSD 14f is a non-volatile rewritable storage unit, and can store data even in a case where power supply of the ECU 14 is turned off. Note that the CPU 14a, the ROM 14b, the RAM 14c, and the like may be integrated in the same package. Furthermore, the ECU 14 may have a configuration in which, instead of the CPU 14a, another logical operation processor such as a digital signal processor (DSP) or a logic circuit is used. Furthermore, a hard disk drive (HDD) may be provided instead of the SSD 14f, and the SSD 14f or the HDD may be provided separately from the ECU 14.

The brake system 18 is, for example, an anti-lock brake system (ABS) that prevents locking up of a brake, electronic stability control (ESC) that reduces chances of skidding of the vehicle 1 at a time of cornering, an electric brake system that enhances braking force (executes brake assist), brake by wire (BBW), and the like. Via an actuator 18a, the brake system 18 applies braking force to the wheels 3, and thus, to the vehicle 1. Furthermore, the brake system 18 can detect a locking up of the brake, idle rotation of the wheels 3, a sign of skidding, or the like on the basis of a difference in rotation between right and left wheels 3, or the like, and execute various kinds of control. The brake sensor 18b is, for example, a sensor that detects a position of the movable part of the brake operation unit 6. The brake sensor 18b can detect a position of the brake pedal as a movable part of the brake operation unit 6. The brake sensor 18b includes a displacement sensor.

The steering-angle sensor 19 is, for example, a sensor that detects a steering amount (steering angle) of the steering unit 4 such as the steering wheel. The steering-angle sensor 19 is configured by using, for example, a Hall element or the like. The ECU 14 acquires an amount of steering the steering unit 4 by the driver, an amount of steering each of the wheels 3 at a time of automatic steering, or the like from the steering-angle sensor 19, and executes various kinds of control. Note that the steering-angle sensor 19 detects a rotation angle of a rotation part included in the steering unit 4.

The accelerator sensor 20 is, for example, a sensor that detects a position of a movable part of the acceleration operation unit 5. The accelerator sensor 20 can detect a position of the accelerator pedal as a movable part. The accelerator sensor 20 includes a displacement sensor.

The shift sensor 21 is, for example, a sensor that detects a position of a movable part of the transmission operation unit 7. The shift sensor 21 can detect positions of a lever, an arm, a button, and the like as movable parts of the transmission operation unit 7. The shift sensor 21 may include a displacement sensor or may be configured as a switch.

The wheel speed sensor 22 is a sensor that detects a rotation amount of the wheels 3, or a rotation rate of the wheels 3 per unit time. The wheel speed sensor 22 outputs the number of wheel speed pulses indicating the detected rotation rate as a sensor value. The wheel speed sensor 22 may be configured by using, for example, a Hall element or the like. The ECU 14 calculates, for example, a movement amount of the vehicle 1 on the basis of the sensor value acquired from the wheel speed sensor 22 and executes various kinds of control. Note that the wheel speed sensor 22 may be provided in the brake system 18. In this case, the ECU 14 acquires, via the brake system 18, a result of detecting the wheel speed sensor 22.

Note that the configurations, arrangements, electrical connection forms, and the like of the various sensors and actuators described above are merely an example, and can be variously set (changed).

In the present embodiment, the ECU 14 implements at least a part of functions as the parking exit assistance apparatus with cooperation of hardware and software (control program).

Figure 5:
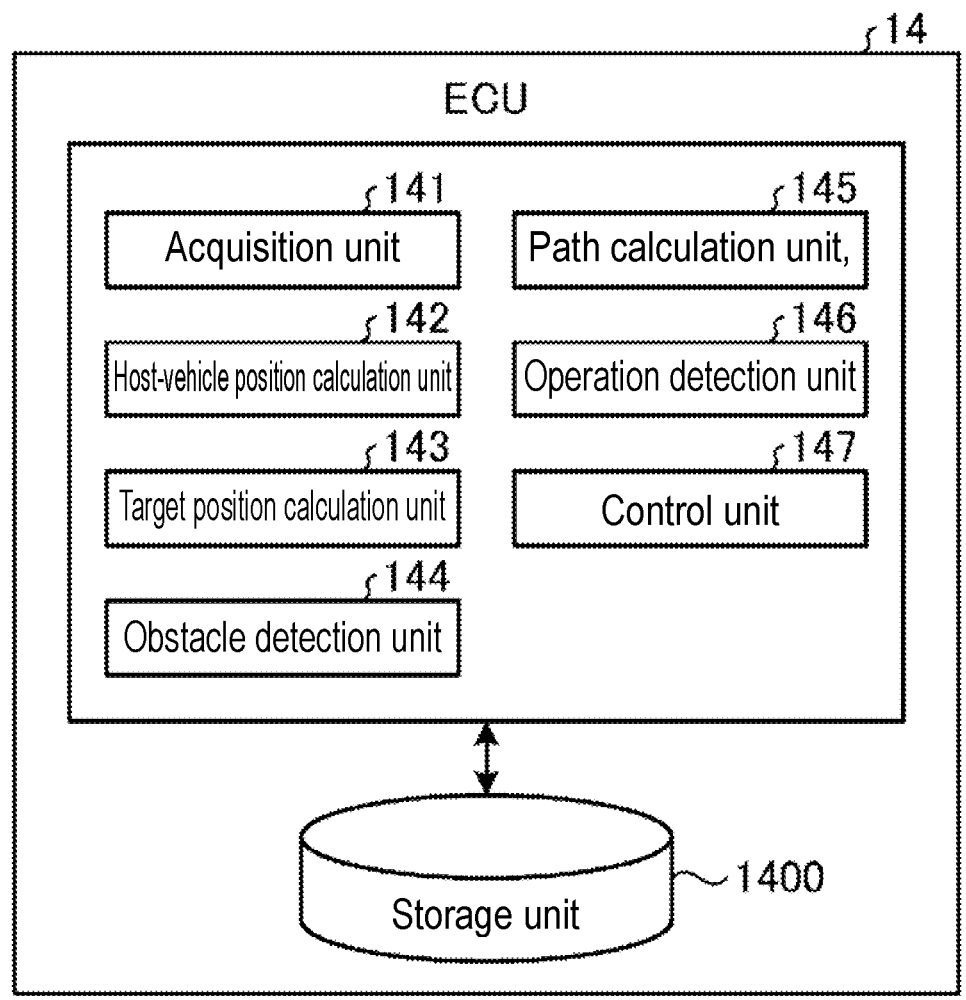
FIG. 5 is an exemplary block diagram of a configuration of an ECU of the parking exit assistance system according to the embodiment.

FIG. 5 is an exemplary block diagram of a configuration of the ECU 14 of the parking exit assistance system 100 according to the embodiment.

As shown in FIG. 5, the ECU 14 functions as an acquisition unit 141, a host-vehicle position calculation unit 142, a target position calculation unit 143, an obstacle detection unit 144, a path calculation unit 145, an operation detection unit 146, a control unit 147, and a storage unit 1400.

The storage unit 1400 stores various data (operation programs, various parameters, various calculation results, and the like).

The acquisition unit 141 acquires information from various sensors and the like. For example, the acquisition unit 141 acquires captured images from the imaging units 15 or acquires steering angle information from the steering-angle sensor 19.

The host-vehicle position calculation unit 142 calculates a current position (host-vehicle position) of the vehicle 1. On the basis of an image captured by the imaging units 15, for example, the host-vehicle position calculation unit 142 calculates the current position (host-vehicle position) of the vehicle 1 in a coordinate system defined by a three-dimensional image.

The target position calculation unit 143 calculates a movement target position of the vehicle 1. In a case where parking assistance control is performed, the movement target position is a target parking position. In a case where parking exit assistance control is performed, the movement target position is a target parking exit position.

The obstacle detection unit 144 detects an obstacle around the vehicle 1. The obstacle detection unit 144 detects an obstacle such as another vehicle, a wall, or a pillar on the basis of, for example, an image captured by an imaging unit 15, results of distance measurement by the ranging units 16 and 17, or the like.

The path calculation unit 145 calculates, on the basis of a result of detecting an obstacle by the obstacle detection unit 144, a parking exit path that is a path along which the vehicle 1 travels when exiting from a parking area.

The operation detection unit 146 detects predetermined operation performed by the driver and determined in advance as a condition for ending parking exit assistance. As the predetermined operation, the operation detection unit 146 detects, for example, at least any of an operation of the steering wheel, operation of the brake, or operation of an accelerator when the gear shift lever is in a drive mode. Note that the predetermined operation may be an operation in a direction in which clearance from the obstacle is not reduced. For example, in a case of the operation of the steering wheel, the operation direction of the steering wheel may be limited to a direction in which the obstacle is avoided.

The control unit 147 executes various kinds of control related to the vehicle 1. For example, the control unit 147 executes at least steering control on the basis of the parking exit path to perform parking exit assistance control for assisting the vehicle 1 to exit from the parking area.

Furthermore, in a case where a positional relation between the vehicle 1 and an obstacle that the vehicle 1 approaches by completion of the exit satisfies a predetermined condition, the control unit 147 ends the parking exit assistance control if a predetermined operation is detected by the operation detection unit 146. Examples of the predetermined condition include the following (1) and (2).

(1) In a case where the vehicle 1 has passed a position where the vehicle 1 comes closest to the obstacle (hereinafter, also referred to as "closest approach condition is satisfied", or the like).

(2) In a case where it is determined that the vehicle 1 is planned to pass on the basis of the parking exit path, with a clearance of a predetermined distance or longer from the obstacle ensured (hereinafter, also referred to as "clearance condition is satisfied", or the like).

However, the predetermined condition is not limited thereto. Note that, in a case where there are a plurality of obstacles that the vehicle 1 approaches by the completion of the exit, either the closest approach condition or the clearance condition is required to be satisfied for all the obstacles.

Here, FIGS. 6A, 6B and 6C are explanatory diagrams of an overview according to the embodiment. In FIGS. 6A, 6B and 6C, a case of a perpendicular-parking forward exit is taken as an example. In FIG. 6A, the vehicle 1 is parked between another vehicle 80 and another vehicle 90 in the parking area. In this state, parking exit assistance control of the vehicle 1 is started.

In FIG. 6B, the vehicle 1 is in the middle of the parking exit assistance control. Furthermore, a position of the vehicle 1 in FIG. 6C is a position at which conventional parking exit assistance control is completed. Conventionally, the vehicle 1 is stopped at the position of the vehicle 1 in FIG. 6C at which the parking exit assistance control is completed, and control is transferred from a system to the driver. However, if the stop is a condition for transfer of control, there is such a problem that it takes time, which is less convenient.

Even at the position of the vehicle 1 in FIG. 6B, there is no problem to transfer the control from the system to the driver as long as safety is ensured. Furthermore, at that time, it is not necessary to stop the vehicle 1. Therefore, as described above, when the driver performs a predetermined operation after either the closest approach condition or the clearance condition is satisfied, the control is transferred from the system to the driver without stopping the vehicle 1. Details will be described below.

Figure 7:
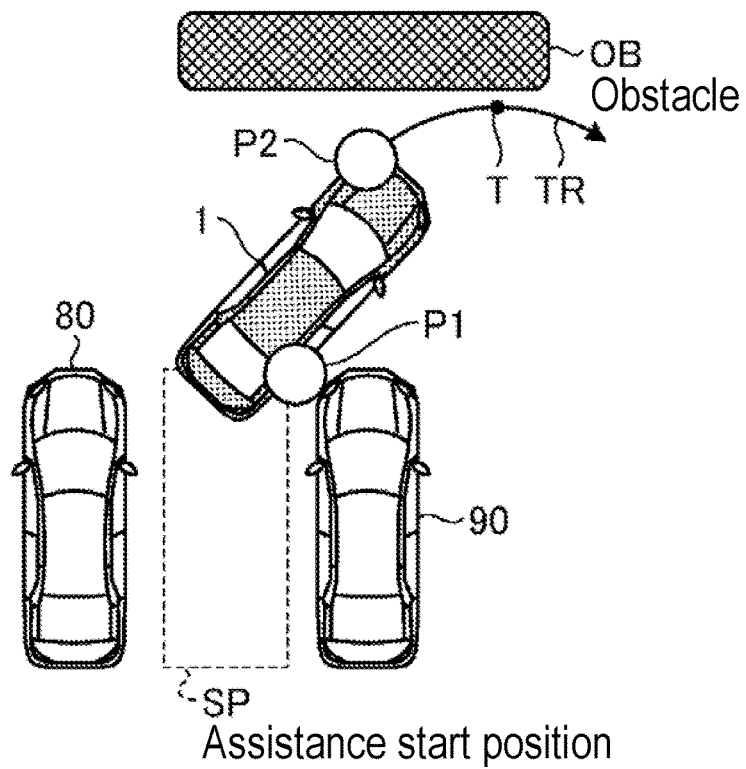
FIG. 7 is an explanatory diagram of an example of a perpendicular-parking forward exit according to the embodiment.

FIG. 7 is an explanatory diagram of an example of a perpendicular-parking forward exit according to the embodiment. The parking exit assistance system 100 of the vehicle 1 starts the parking exit assistance control at an assistance start position SP. A point P1 is a side surface of an inner-side of a turning rear wheel shaft of the vehicle 1. In a case where the vehicle 1 moves forward, and the point P1 has passed a position where the vehicle 1 comes closest to the another vehicle 90, it can be said that safety of the vehicle 1 is ensured for a relation with the another vehicle 90. Furthermore, even before that, if it is determined that the vehicle 1 (point P1) is planned to pass with a clearance of the predetermined distance or longer from the another vehicle 90 ensured, it can be said that safety of the vehicle 1 is ensured for a relation with the another vehicle 90.

Therefore, in a case of a perpendicular-parking forward exit, the control unit 147 ends parking exit assistance control if a predetermined operation is detected by the operation detection unit 146 in a case where the side surface of the inner-side of the turning rear wheel shaft of the vehicle 1 has passed a position where the vehicle 1 comes closest to the another vehicle 90 as an obstacle, the another vehicle 90 being parked next to an exit direction side of the vehicle 1 in the parking area, or in a case where it is determined that the vehicle 1 is planned to pass on the basis of a parking exit path, with a clearance of the predetermined distance or longer from the another vehicle 90 ensured.

Furthermore, a point P2 is a portion near a left end of a front end part of the vehicle 1. In a case where the vehicle 1 has moved forward and passed a position where the point P2 comes closest to an obstacle OB (the point P2 at a point T on a locus TR), it can be said that safety of the vehicle 1 is ensured for a relation with the obstacle OB. Furthermore, even before that, if it is determined that the vehicle 1 (point P2) is planned to pass with a clearance of the predetermined distance or longer from the obstacle OB ensured, it can be said that safety of the vehicle 1 is ensured for a relation with the obstacle OB.

Therefore, in a case of a perpendicular-parking forward exit, the control unit 147 ends parking exit assistance control if a predetermined operation is detected by the operation detection unit 146 in a case where the front end part of the vehicle 1 has passed a position where the vehicle 1 comes closest to the obstacle OB positioned across an aisle in front of the vehicle 1 in the parking area, or in a case where it is determined that the vehicle 1 is planned to pass on the basis of a parking exit path, with a clearance of the predetermined distance or longer from the obstacle OB ensured.

Figure 8:
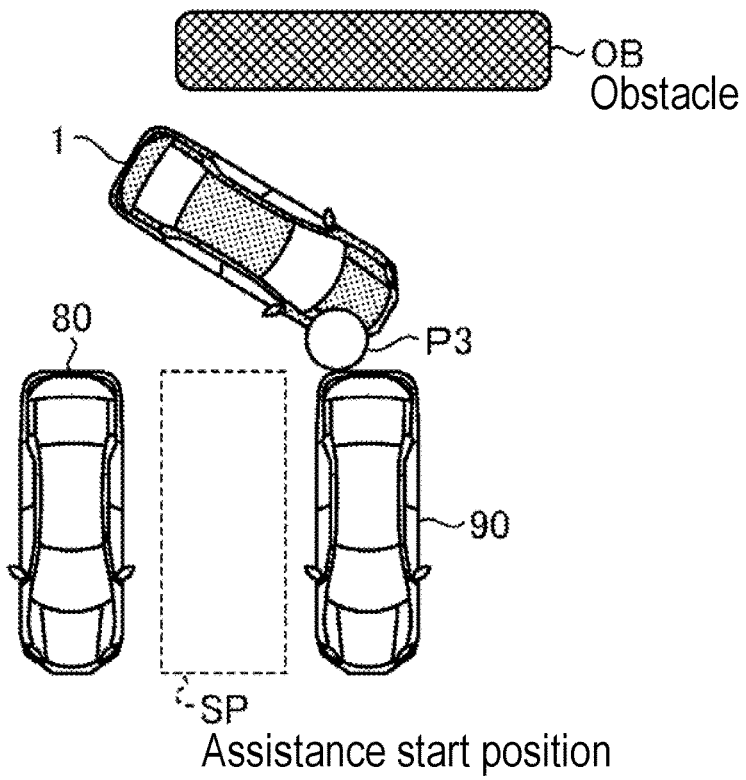
FIG. 8 is an explanatory diagram of an example of a perpendicular-parking reverse exit according to the embodiment.

FIG. 8 is an explanatory diagram of an example of a perpendicular-parking reverse exit according to the embodiment. The parking exit assistance system 100 of the vehicle 1 starts the parking exit assistance control at an assistance start position SP. A point P3 is a portion near a right end of the front end part of the vehicle 1. In a case where the vehicle 1 has once moved backward toward the another vehicle 80 and then moved forward, and the point P3 has passed a position where the vehicle 1 comes closest to the another vehicle 90, it can be said that safety of the vehicle 1 is ensured for a relation with the another vehicle 90. Furthermore, even before that, if it is determined that the vehicle 1 (point P3) is planned to pass with a clearance of the predetermined distance or longer from the another vehicle 90 ensured, it can be said that safety of the vehicle 1 is ensured for a relation with the another vehicle 90.

Therefore, in a case of a perpendicular-parking reverse exit, the control unit 147 ends parking exit assistance control if a predetermined operation is detected by the operation detection unit 146 in a case where the front end part of the vehicle 1 has passed a position where the vehicle 1 comes closest to the another vehicle 90 as an obstacle, the another vehicle 90 being parked next to a travel direction side of the exited vehicle 1 in the parking area, or in a case where it is determined that the vehicle 1 is planned to pass on the basis of a parking exit path, with a clearance of the predetermined distance or longer from the another vehicle 90 ensured.

Figure 9:
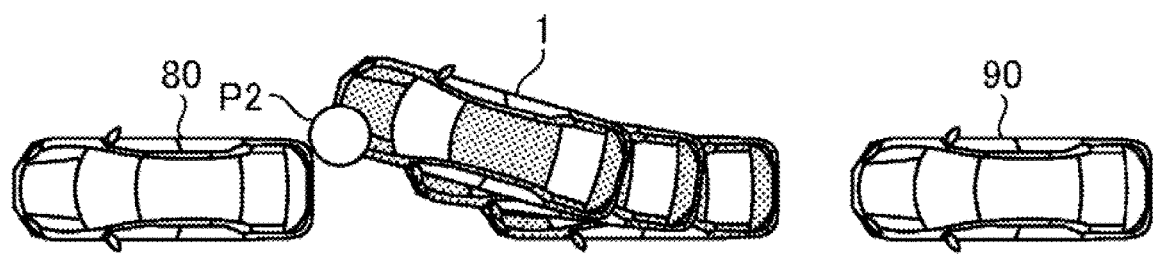
FIG. 9 is an explanatory diagram of an example of a parallel-parking exit according to the embodiment.

FIG. 9 is an explanatory diagram of an example of a parallel-parking exit according to the embodiment. In a case where the vehicle 1 has moved forward, and the point P2 has passed a position where the vehicle 1 comes closest to the another vehicle 80, it can be said that safety of the vehicle 1 is ensured for a relation with the another vehicle 80. Furthermore, even before that, if it is determined that the vehicle 1 (point P2) is planned to pass with a clearance of the predetermined distance or longer from the another vehicle 80 ensured, it can be said that safety of the vehicle 1 is ensured for a relation with the another vehicle 80.

Therefore, in a case of a parallel-parking exit, the control unit 147 ends parking exit assistance control if a predetermined operation is detected by the operation detection unit 146 in a case where the front end part of the vehicle 1 has passed a position where the vehicle 1 comes closest to the another vehicle 80 as an obstacle, the another vehicle 80 being parked in front of the vehicle 1 after the exit in the parking area, or in a case where it is determined that the vehicle 1 is planned to pass on the basis of a parking exit path and a steering angle, with a clearance of the predetermined distance or longer from the another vehicle 80 ensured.

Figure 10:
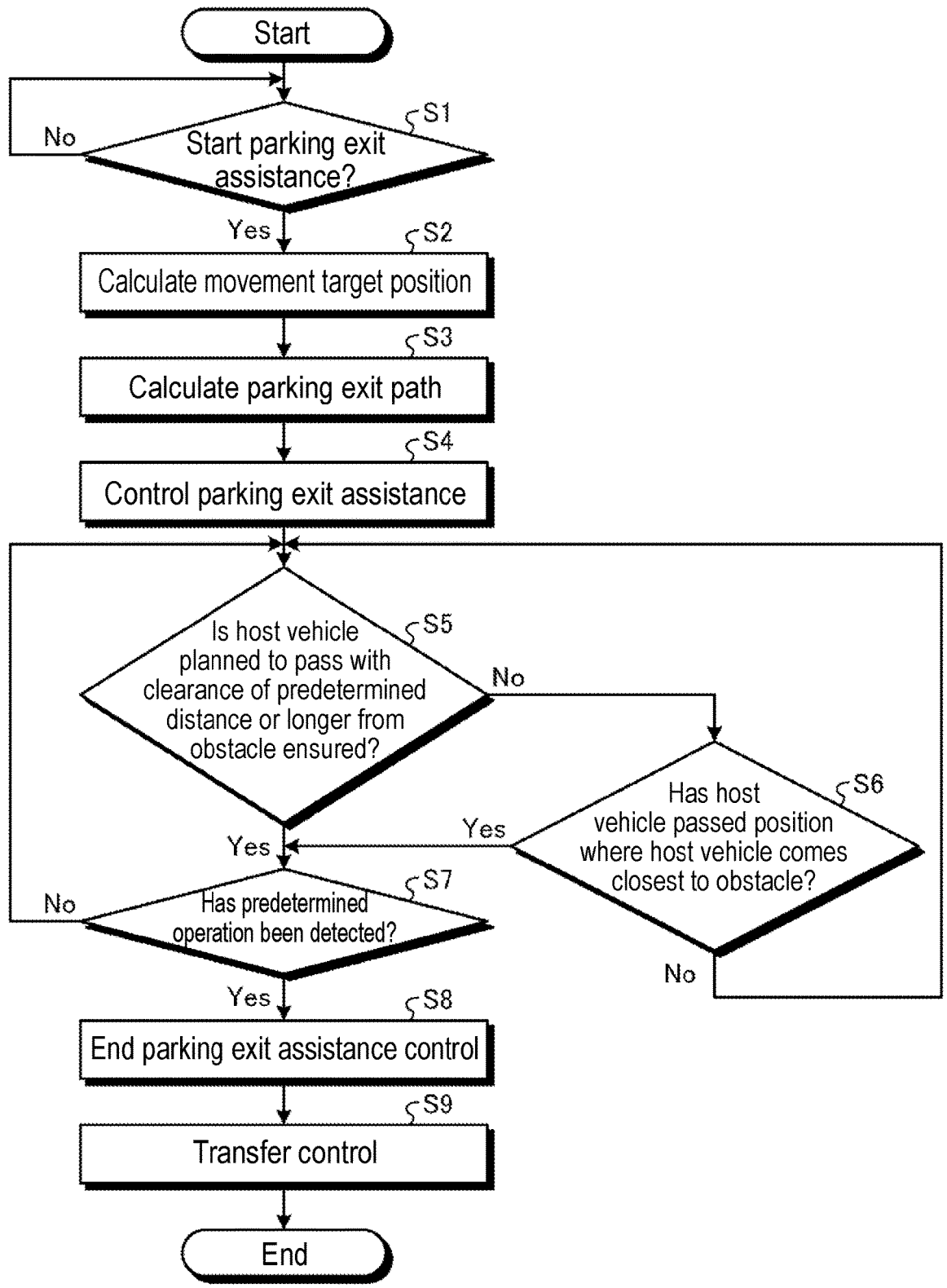
FIG. 10 is a flowchart showing an example of processing by the parking exit assistance system according to the embodiment.

Next, an example of processing by the parking exit assistance system 100 according to the embodiment will be described with reference to FIG. 10. FIG. 10 is a flowchart showing an example of processing by the parking exit assistance system 100 according to the embodiment. Note that this series of processing is performed on assumption that acquisition of captured images from the imaging units 15 by the acquisition unit 141, calculation of a current position of the vehicle 1 by the host-vehicle position calculation unit 142, detection of an obstacle by the obstacle detection unit 144, and the like are appropriately performed.

First, in Step S1, the control unit 147 determines whether or not to start parking exit assistance. If Yes, the processing proceeds to Step S2, and if No, the processing returns to Step S1. For example, when the driver performs parking exit assistance start operation by using the operation input unit 10, the control unit 147 starts the parking exit assistance.

The parking exit assistance is executed, for example, in an automatic steering mode. In the automatic steering mode, the driver does not need to operate the steering unit 4, specifically, the steering wheel. Furthermore, forward driving force and backward driving force of the vehicle 1 are achieved, for example, by utilizing idle creep in which driving force of an engine is transmitted without the driver performing an operation of pressing on the accelerator pedal, which is an operation of the acceleration operation unit 5. Therefore, the driver is only required to operate the brake pedal as the brake operation unit 6 and the gear shift lever as the transmission operation unit 7, according to display on the display device 12.

Note that the parking exit assistance is not limited to that in the automatic steering mode, and may be executed in another mode such as a fully automatic mode in which acceleration and deceleration are also controlled.

In Step S2, the target position calculation unit 143 calculates a movement target position (target parking exit position) of the vehicle 1.

Next, in Step S3, the path calculation unit 145 calculates a parking exit path on the basis of a result of detecting an obstacle by the obstacle detection unit 144.*s*

Next, in Step S4, the control unit 147 performs parking exit assistance control.

Next, in Step S5, the control unit 147 determines whether or not the vehicle 1 (host vehicle) is planned to pass with a clearance of the predetermined distance or longer from the obstacle ensured. If Yes, the processing proceeds to Step S7, and if No, the processing proceeds to Step S6.

In Step S6, the control unit 147 determines whether or not the vehicle 1 (host vehicle) has passed a position where the vehicle 1 comes closest to the obstacle. If Yes, the processing proceeds to Step S7, and if No, the processing returns to Step S5.

In Step S7, the operation detection unit 146 determines whether or not a predetermined operation (for example, an operation of the steering wheel when the gear shift lever is in the drive mode) by the driver has been detected. If Yes, the processing proceeds to Step S8, and if No, the processing returns to Step S5.

In Step S8, the control unit 147 ends the parking exit assistance control.

Next, in Step S9, the control unit 147 transfers control from the parking exit assistance system 100 to the driver.

First Modification

Next, a first modification will be described. At a time of parking exit assistance control of the vehicle 1, even in a case where there is no obstacle, a virtual obstacle may be set, and processing similar to processing for when there is an obstacle may be executed. By doing so, for example, it is possible to avoid a situation where there is a large difference in, for example, timing of transfer of control after completion of parking exit assistance control, between when there is an obstacle and when there is no obstacle, providing a feeling of strangeness to the driver.

Second Modification

Next, a second modification will be described. The parking exit assistance control may be completed either when a condition of completing parking exit assistance control described above is satisfied or when a condition of completing parking exit assistance control according to conventional technology is satisfied.

As described above, according to the parking exit assistance system 100 of the present embodiment, in a case where a positional relation between a host vehicle and an obstacle that the host vehicle approaches by completion of exit satisfies a predetermined condition, a predetermined operation by a driver ends parking exit assistance control, by which safety can be ensured even if control is transferred to the driver without the vehicle 1 stopping. In particular, convenience is greatly improved for a driver who is accustomed to driving.

Furthermore, as the predetermined condition, specifically, the above-described closest approach condition, clearance condition, and the like can be adopted.

Furthermore, the parking exit assistance system 100 detects, as the predetermined operation, at least any of an operation of a steering wheel, operation of a brake, or operation of an accelerator when a gear shift lever is in a drive mode, thereby being able to reliably recognize that the driver wishes transfer of the control.

Furthermore, for example, safety can be further ensured by setting, as the predetermined operation, an operation in a direction in which a clearance from the obstacle is not reduced.

Furthermore, as described with reference to FIG. 7, in a case of a perpendicular-parking forward exit, it is possible to end the parking exit assistance control and transfer control to the driver while reliably avoiding a situation where the host vehicle hits the another vehicle 90 parked next to the exit direction side of the host vehicle.

Furthermore, as described with reference to FIG. 7, in a case of a perpendicular-parking forward exit, it is possible to end the parking exit assistance control and transfer control to the driver while reliably avoiding a situation where the host vehicle hits the obstacle OB positioned across the aisle in front of the vehicle in the parking area.

Furthermore, as described with reference to FIG. 8, in a case of a perpendicular-parking reverse exit, it is possible to end the parking exit assistance control and transfer control to the driver while reliably avoiding a situation where the host vehicle hits the another vehicle 90 parked next to the travel direction side of the exited host vehicle.

Furthermore, as described with reference to FIG. 9, in a case of a parallel-parking exit, it is possible to end the parking exit assistance control and transfer control to the driver while reliably avoiding a situation where the host vehicle hits the another vehicle 80 parked in front of the host vehicle.

The embodiment of the present disclosure described herein is by way of an example only, and is not intended to limit the scope of the invention. The novel embodiment described may be implemented in a variety of other forms, and various omissions, substitutions, and changes may be made without departing from the gist of the disclosure. These embodiment and modifications thereof are included in the scope and gist of the disclosure, and are included in the invention described in the claims and range of equivalents thereof.

For example, it is conceivable that a condition of completing parking exit assistance control is already satisfied before the vehicle 1 starts to move after the parking exit assistance is started. However, if the parking exit assistance control is completed before the vehicle 1 starts to move, the driver may feel strange. Therefore, the completion of the parking exit assistance control may be limited to after start of movement of the vehicle 1.

Furthermore, in a case where it is determined whether or not the vehicle 1 has come closest to the obstacle, an angle (direction) of an aisle in front of the vehicle 1 in a parking area may be used as a reference. This makes it possible to make a more accurate judgment, particularly in a case of a diagonal parking space or the like.

REFERENCE SIGNS LIST

1: Vehicle, 4: Steering unit, 5: Acceleration operation unit, 6: Brake operation unit, 7: Transmission operation unit, 14: ECU, 100: Parking exit assistance system, 141: Acquisition unit, 142: Host-vehicle position calculation unit, 143: Target position calculation unit, 144: Obstacle detection unit, 145: Path calculation unit, 146: Operation detection unit, 147: Control unit, and 1400: Storage unit

The invention claimed is:

1. A parking exit assistance apparatus comprising:
    an obstacle detection unit that detects an obstacle around a host vehicle;
    a path calculation unit that calculates, on the basis of a result of detecting the obstacle by the obstacle detection unit, a parking exit path that is a path along which the host vehicle travels when exiting from a parking area;
    an operation detection unit that detects a predetermined operation performed by a driver; and
    a control unit that executes at least steering control on the basis of the parking exit path to perform parking exit assistance control for assisting the host vehicle to exit from the parking area, and,
    in a case where a positional relation between the host vehicle and the obstacle that the host vehicle approaches by completion of the exit satisfies a predetermined condition, ends the parking exit assistance control if the predetermined operation is detected by the operation detection unit,
    wherein the predetermined condition is a state where the host vehicle has passed a position where the host vehicle comes closest to the obstacle along the parking exit path.

2. The parking exit assistance apparatus according to claim 1, wherein the predetermined condition is a state where it is determined that the host vehicle is planned to pass on the basis of the parking exit path, with a clearance of a predetermined distance or longer from the obstacle ensured.

3. The parking exit assistance apparatus according to claim 1, wherein the operation detection unit detects, as the predetermined operation, at least any of an operation of a steering wheel, operation of a brake, or operation of an accelerator when a gear shift lever is in a drive mode.

4. The parking exit assistance apparatus according to claim 3, wherein the predetermined operation is an operation in a direction in which a clearance from the obstacle is not reduced.

5. The parking exit assistance apparatus according to claim 1,
    wherein, in a case of a perpendicular-parking forward exit,
    the control unit ends the parking exit assistance control if the predetermined operation is detected by the operation detection unit in a case where a side surface of an inner-side of a turning rear wheel shaft of the host vehicle has passed a position where the host vehicle comes closest to another vehicle as the obstacle, the another vehicle being parked next to an exit direction side of the host vehicle in the parking area, or in a case where it is determined that the host vehicle is planned to pass on the basis of the parking exit path, with a clearance of the predetermined distance or longer from the another vehicle ensured.

6. The parking exit assistance apparatus according to claim 1, further comprising an acquisition unit that acquires, from a steering-angle sensor that detects a steering angle of the host vehicle, the steering angle,
    wherein, in a case of a parallel-parking exit,
    the control unit ends the parking exit assistance control if the predetermined operation is detected by the operation detection unit in a case where a front end part of the host vehicle has passed a position where the host vehicle comes closest to another vehicle as the obstacle, the another vehicle being parked in front of the host vehicle in the parking area, or in a case where it is determined that the host vehicle is planned to pass on the basis of the parking exit path and the steering angle, with a clearance of the predetermined distance or longer from the another vehicle ensured.

7. A parking exit assistance apparatus comprising:

an obstacle detection unit that detects an obstacle around a host vehicle;

a path calculation unit that calculates, on the basis of a result of detecting the obstacle by the obstacle detection unit, a parking exit path that is a path along which the host vehicle travels when exiting from a parking area;

an operation detection unit that detects a predetermined operation performed by a driver; and a control unit that executes at least steering control on the basis of the parking exit path to perform parking exit assistance control for assisting the host vehicle to exit from the parking area, and, in a case where a positional relation between the host vehicle and the obstacle that the host vehicle approaches by completion of the exit satisfies a predetermined condition, ends the parking exit assistance control if the predetermined operation is detected by the operation detection unit, wherein, in a case of a perpendicular-parking forward exit, the control unit ends the parking exit assistance control if the predetermined operation is detected by the operation detection unit in a case where a front end part of the host vehicle has passed a position where the host vehicle comes closest to the obstacle positioned across an aisle in front of the host vehicle in the parking area, or in a case where it is determined that the host vehicle is planned to pass on the basis of the parking exit path, with a clearance of the predetermined distance or longer from the obstacle ensured.

8. A parking exit assistance apparatus comprising:

an obstacle detection unit that detects an obstacle around a host vehicle;

a path calculation unit that calculates, on the basis of a result of detecting the obstacle by the obstacle detection unit, a parking exit path that is a path along which the host vehicle travels when exiting from a parking area;

an operation detection unit that detects a predetermined operation performed by a driver; and a control unit that executes at least steering control on the basis of the parking exit path to perform parking exit assistance control for assisting the host vehicle to exit from the parking area, and, in a case where a positional relation between the host vehicle and the obstacle that the host vehicle approaches by completion of the exit satisfies a predetermined condition, ends the parking exit assistance control if the predetermined operation is detected by the operation detection unit, wherein, in a case of a perpendicular-parking reverse exit, the control unit ends the parking exit assistance control if the predetermined operation is detected by the operation detection unit in a case where a front end part of the host vehicle has passed a position where the host vehicle comes closest to another vehicle as the obstacle, the another vehicle being parked next to a travel direction side of exited the host vehicle in the parking area, or in a case where it is determined that the host vehicle is planned to pass on the basis of the parking exit path, with a clearance of the predetermined distance or longer from the another vehicle ensured.

* * * * *